US012572238B2

(12) United States Patent (10) Patent No.: US 12,572,238 B2
Barel et al. (45) Date of Patent: Mar. 10, 2026

(54) COMPENSATING FOR TOUCH-SCREEN COUPLING THROUGH DISPLAY ELECTRODE

(71) Applicant: Microsoft Technology Licensing, LLC, Redmond, WA (US)

(72) Inventors: Eliyahu Barel, Rosh-HaAyin (IL); On Haran, Kfar Saba (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/546,076

(22) PCT Filed: Feb. 10, 2022

(86) PCT No.: PCT/US2022/070602
§ 371 (c)(1),
(2) Date: Aug. 10, 2023

(87) PCT Pub. No.: WO2022/178493
PCT Pub. Date: Aug. 25, 2022

(65) Prior Publication Data
US 2024/0118770 A1 Apr. 11, 2024

(30) Foreign Application Priority Data

Feb. 18, 2021 (NL) ...................................... 2027589

(51) Int. Cl.
*G06F 3/044* (2006.01)
*G06F 3/041* (2006.01)

(52) U.S. Cl.
CPC .......... *G06F 3/0418* (2013.01); *G06F 3/0412* (2013.01); *G06F 3/0443* (2019.05);
(Continued)

(58) Field of Classification Search
CPC ........... G06F 3/04166; G06F 3/041661; G06F 3/0418; G06F 3/0443; G06F 3/0446; G06F 3/0412; G06F 3/0445; G06F 2203/04112
See application file for complete search history.

(56) References Cited

U.S. PATENT DOCUMENTS 6,297,811 B1 10/2001 Ravid et al.
8,659,573 B2 2/2014 Haga et al.
(Continued)

FOREIGN PATENT DOCUMENTS

EP 2363788 A2 9/2011

OTHER PUBLICATIONS

Lee, et al., "Mutual Capacitive Sensing Touch Screen Controller for Ultrathin Display with Extended Signal Passband Using Negative Capacitance", In Journal of Sensors, vol. 18, Issue 11, Oct. 26, 2018, 13 Pages.
(Continued)

*Primary Examiner* — Dennis P Joseph
(74) *Attorney, Agent, or Firm* — Alleman Hall LLP

(57) ABSTRACT

A touch-screen display device comprises a series of column electrodes and a series of row electrodes, with an electronic display layer arranged behind the series of column electrodes and behind the series of row electrodes. The series of row electrodes crosses the series of column electrodes such that the electrical impedance at each crossing of a row and column electrode is responsive to the proximity of a touch input to that crossing. A row-drive circuit is configured to apply an excitation signal to a selected row electrode and to concurrently apply a compensation signal to one or more other row electrodes, the compensation signal being out of phase with respect to the excitation signal. A column-sense circuit is configured to sense a column signal from the series
(Continued)

of column electrodes and to provide a corresponding column output.

14 Claims, 13 Drawing Sheets

(52) U.S. Cl.
CPC .......... G06F 3/0446 (2019.05); G06F 3/0441 (2019.05); G06F 2203/04112 (2013.01)

(56) References Cited

U.S. PATENT DOCUMENTS

| | | | |
|---|---|---|---|
| 9,164,641 | B1 | 10/2015 | Rowe |
| 9,189,116 | B2 | 11/2015 | Cheng et al. |
| 9,391,610 | B2 | 7/2016 | Gourevitch et al. |
| 10,146,360 | B2 | 12/2018 | Vandermeijden et al. |
| 10,698,534 | B2 | 6/2020 | Bye |
| 10,712,885 | B2 | 7/2020 | Bye |
| 10,719,177 | B2 | 7/2020 | Pedersen et al. |
| 2006/0267953 | A1 | 11/2006 | Peterson et al. |
| 2010/0295813 | A1 | 11/2010 | Kent |
| 2011/0115729 | A1 | 5/2011 | Kremin et al. |
| 2011/0216033 | A1* | 9/2011 | Mamba ................. G06F 3/0446 345/174 |
| 2012/0327016 | A1 | 12/2012 | Hristov |
| 2014/0232684 | A1 | 8/2014 | Mamba |
| 2015/0002445 | A1 | 1/2015 | Brunet et al. |
| 2015/0053459 | A1 | 2/2015 | Fried |
| 2015/0109244 | A1 | 4/2015 | Jang et al. |
| 2016/0092023 | A1 | 3/2016 | Hideo |
| 2016/0117054 | A1 | 4/2016 | Mamba |
| 2016/0147319 | A1 | 5/2016 | Agarwal |
| 2016/0188105 | A1 | 6/2016 | Kremin et al. |
| 2017/0185182 | A1 | 6/2017 | Chandran |
| 2019/0064962 | A1 | 2/2019 | Bye |
| 2019/0102017 | A1 | 4/2019 | Kim et al. |
| 2019/0204959 | A1 | 7/2019 | Ko et al. |
| 2019/0302951 | A1 | 10/2019 | Shepelev et al. |
| 2021/0026484 | A1 | 1/2021 | Kim |
| 2021/0191544 | A1* | 6/2021 | Luo ....................... G06F 3/0416 |
| 2024/0077974 | A1 | 3/2024 | Haran |

OTHER PUBLICATIONS

"Search Report and Written Opinion Issued in Netherlands Patent Application No. N2027486", Mailed Date: Nov. 9, 2021, 12 Pages.

"Search Report and Wriiten Opinion Issued in Netherlands Patent Application No. N2027589", Mailed Date: Nov. 16, 2021, 14 Pages.

"International Search Report and Written Opinion Issued in PCT Application No. PCT/US22/014522", Mailed Date: Apr. 29, 2022, 13 Pages.

"International Search Report and Written Opinion Issued in PCT Application No. PCT/US22/070602", Mailed Date: May 3, 2022, 15 Pages.

Non-Final Office Action issued in U.S. Appl. No. 18/262,609, mailed on May 13, 2024, 18 Pages.

Final Office Action mailed on Nov. 26, 2024, in U.S. Appl. No. 18/262,609, 22 Pages.

Non-Final Office Action mailed on Jul. 2, 2025, in U.S. Appl. No. 18/262,609, 18 pages.

Final Office Action mailed on Oct. 21, 2025, in U.S. Appl. No. 18/262,609, 19 pages.

* cited by examiner

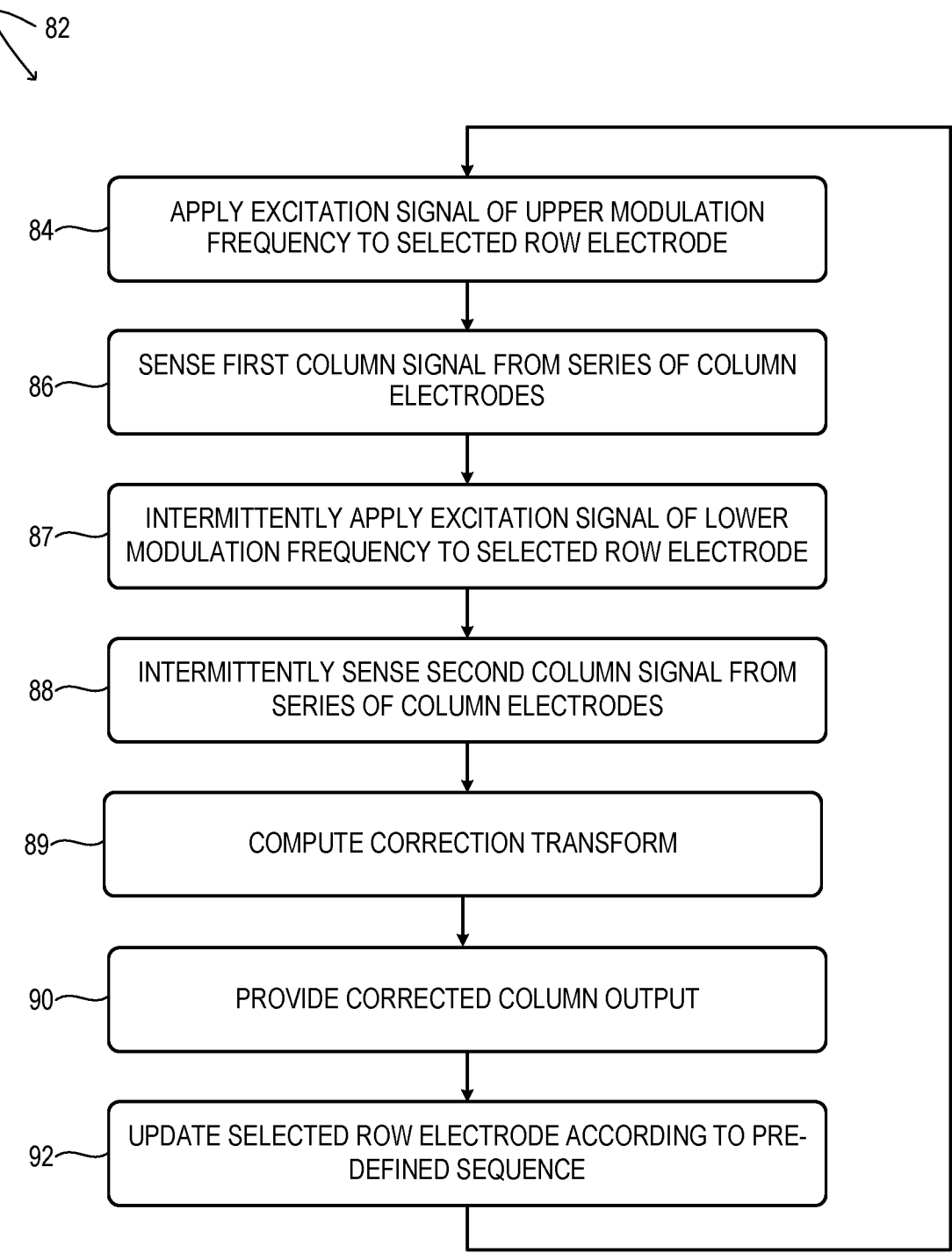

82

84 — APPLY EXCITATION SIGNAL OF UPPER MODULATION FREQUENCY TO SELECTED ROW ELECTRODE

86 — SENSE FIRST COLUMN SIGNAL FROM SERIES OF COLUMN ELECTRODES

87 — INTERMITTENTLY APPLY EXCITATION SIGNAL OF LOWER MODULATION FREQUENCY TO SELECTED ROW ELECTRODE

88 — INTERMITTENTLY SENSE SECOND COLUMN SIGNAL FROM SERIES OF COLUMN ELECTRODES

89 — COMPUTE CORRECTION TRANSFORM

90 — PROVIDE CORRECTED COLUMN OUTPUT

92 — UPDATE SELECTED ROW ELECTRODE ACCORDING TO PRE-DEFINED SEQUENCE

Figure 10:
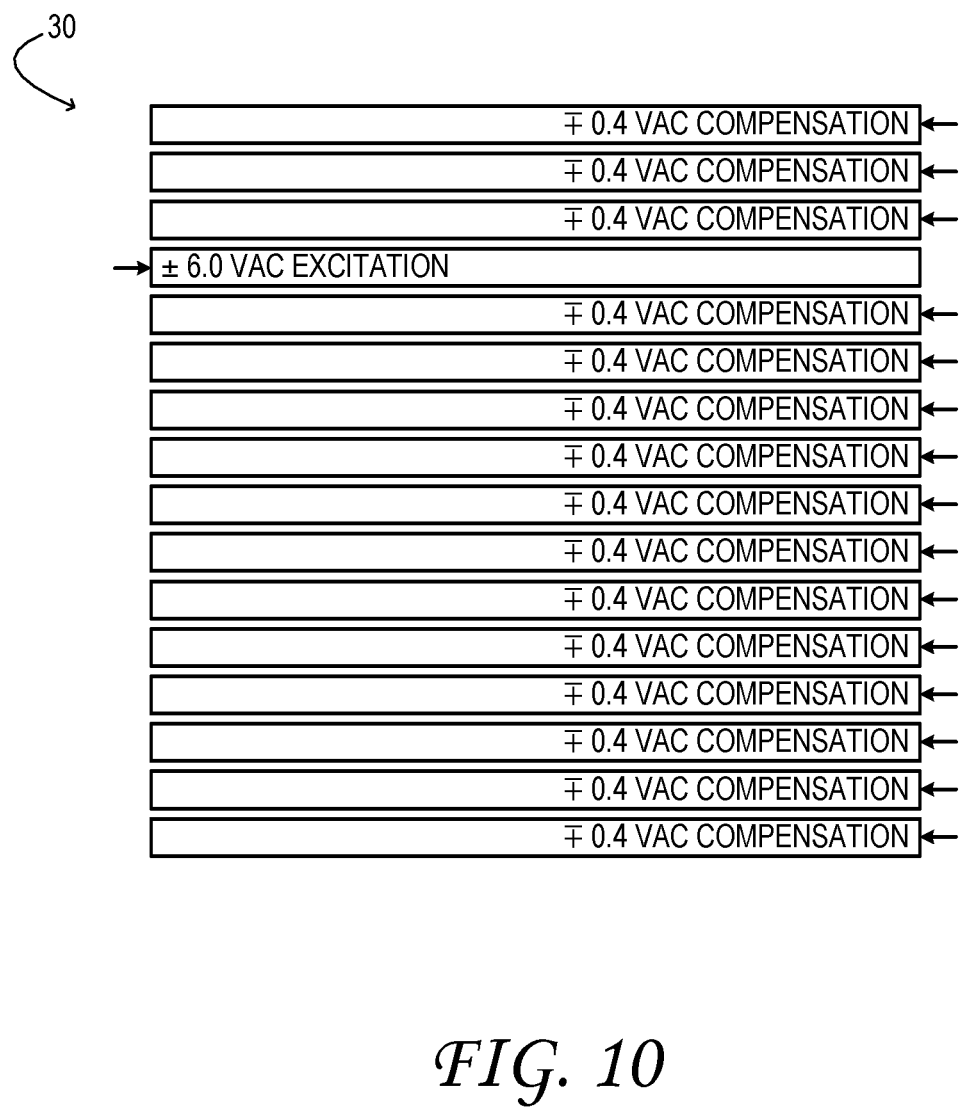

∓ 0.4 VAC COMPENSATION ←

∓ 0.4 VAC COMPENSATION ←

∓ 0.4 VAC COMPENSATION ←

→ ± 6.0 VAC EXCITATION

∓ 0.4 VAC COMPENSATION ←

∓ 0.4 VAC COMPENSATION ←

∓ 0.4 VAC COMPENSATION ←

∓ 0.4 VAC COMPENSATION ←

∓ 0.4 VAC COMPENSATION ←

∓ 0.4 VAC COMPENSATION ←

∓ 0.4 VAC COMPENSATION ←

∓ 0.4 VAC COMPENSATION ←

∓ 0.4 VAC COMPENSATION ←

∓ 0.4 VAC COMPENSATION ←

∓ 0.4 VAC COMPENSATION ←

∓ 0.4 VAC COMPENSATION ←

98 — APPLY EXCITATION SIGNAL TO SELECTED ROW ELECTRODE

100 — CONCURRENTLY APPLY OUT-OF-PHASE COMPENSATION SIGNAL TO OTHER ROW ELECTRODES

102 — SENSE COLUMN SIGNAL

104 — PROVIDE COLUMN OUTPUT

106 — UPDATE SELECTED ROW ELECTRODE ACCORDING TO PRE-DEFINED SEQUENCE

COMPENSATING FOR TOUCH-SCREEN COUPLING THROUGH DISPLAY ELECTRODE

CROSS REFERENCE TO RELATED APPLICATIONS

The present application is a U.S. National Phase of International Patent Application Serial No. PCT/US2022/070602 entitled "COMPENSATING FOR TOUCH-SCREEN COUPLING THROUGH DISPLAY ELECTRODE", filed Feb. 10, 2022, which claims priority to Netherlands Patent Application Serial No. 2027589, filed Feb. 18, 2021, the entire contents of each of which are hereby incorporated by reference for all purposes.

BACKGROUND

Capacitive touch screens are used in electronic devices ranging from computer monitors and tablet computers to smartphones and other handheld devices. A capacitive touch screen may be capable of tracking touch or hover of a user's finger, of a stylus held in the user's hand, or of input devices of various other forms. In some implementations, capacitive touch-screen componentry is applied directly to the viewing surface of an electronic display, such as a liquid-crystal display (LCD) or an organic light-emitting diode (OLED) display. The resulting touch-screen display stack provides a basis for integrated display-and-input functionality.

SUMMARY

One aspect of this disclosure is directed to a touch-screen display device comprising a series of column electrodes and a series of row electrodes, with an electronic display layer arranged behind the series of column electrodes and behind the series of row electrodes. The series of row electrodes crosses the series of column electrodes such that the electrical impedance at each crossing of a row and column electrode is responsive to the proximity of a touch input to that crossing. A row-drive circuit is configured to apply an excitation signal to a selected row electrode and to concurrently apply a compensation signal to one or more other row electrodes, the compensation signal being out of phase with respect to the excitation signal. A column-sense circuit is configured to sense a column signal from the series of column electrodes and to provide a corresponding column output.

Another aspect of this disclosure is directed to a method to process touch input on a touch-screen display device having an electronic display layer arranged behind a series of column electrodes and behind a series of row electrodes, where the electrical impedance at each crossing of a row and column electrode is responsive to proximity of the touch input to that crossing. In this method an excitation signal of an upper modulation frequency is applied to a selected row electrode and a first column signal is sensed. Intermittently an excitation signal of a lower modulation frequency is applied to the selected row electrode and a second column signal is sensed. A correction transform is then computed based partly on the first and second column signals, and a corrected column output is provided based at least partly on the first column signal and on the correction transform.

This Summary is provided to introduce in simplified form a selection of concepts that are further described in the Detailed Description. This Summary is not intended to identify key features or essential features of the claimed subject matter, nor is it intended to be used to limit the scope of the claimed subject matter. The claimed subject matter is not limited to implementations that solve any or all disadvantages noted in any part of this disclosure.

BRIEF DESCRIPTION OF THE DRAWINGS

FIG. 9 shows aspects of an example method to process touch input on a touch-screen display device.

FIG. 10 shows aspects of an example series of row electrodes of a capacitive touch sensor.

DETAILED DESCRIPTION

As touch-screen display stacks become thinner, driven by modern design practice, certain issues emerge. One issue is that the dielectric layer that separates touch-screen electrodes from the common electrode of an underlying electronic display may itself be very thin. Extreme thinness of the dielectric layer (e.g., <30 micrometers ($\mu$m)) can result in strong capacitive coupling between touch-screen and display electrodes at frequencies used to drive the touch-screen electrodes. More specifically, capacitive coupling via the common electrode of the display may provide an undesirable low-impedance path between the row electrodes excited by the touch-screen driver and the column electrodes through which the touch point is sensed. This low-impedance path contributes an undesired, always-on component to the signal from each column electrode, thereby decreasing the touch sensitivity. Disclosed herein is a series of solutions that address this problem.

In one solution, integrated logic of the touch-screen display device is configured to estimate the undesired component by intermittently lowering the modulation frequency used to excite the row electrodes, and then re-sampling the column signal. At lower modulation frequencies, the impedance change due to capacitive coupling via the common electrode of the display is weaker and adds less of the undesired component to the column signal. By comparing the column signal sampled at upper and lower modulation frequencies, the level of the undesired component on the column signal at the upper modulation frequency can be estimated and corrected in real time—e.g., by using a look up table. This tactic improves touch sensitivity in very thin capacitive touch-screen display stacks.

Another solution leverages the row-driving scheme typically used in capacitive touch screens, where each row electrode is excited in a predetermined sequence while the other row electrodes remain undriven. Here, a small compensation signal may be applied to some or all of the non-excited row electrodes. The combined effect of the compensation signal is to cure the AC ground fault of the common electrode, poising it at the same ground potential against which the column signal is referenced. In that manner, the undesired component due to capacitive coupling through the common electrode is reduced or eliminated.

Figure 1:
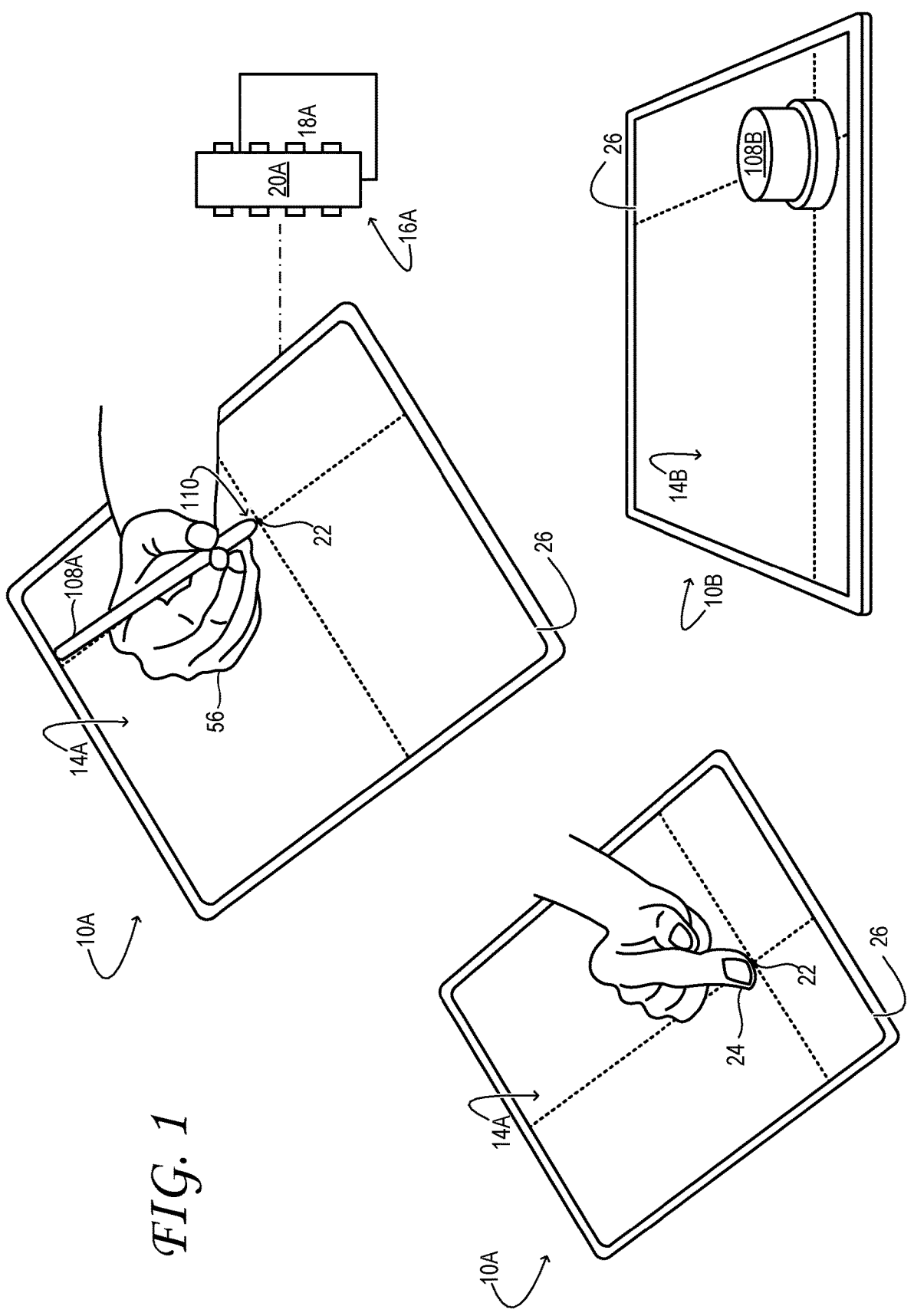
FIG. 1 shows aspects of an example touch-screen display device.

Turning now to the drawings, FIG. 1 shows aspects of an example touch-screen display device 10A. Touch-screen display device 10A is a tablet computer system comprising an electronic display 14A and an integrated computer 16A. In other examples, a touch-screen display device may take the form of a smartphone, handheld game system, laptop computer system, all-in-one computer system, or computer monitor. In some examples, the touch-screen display device, including the electronic display and touch-sensing componentry, may by curved, flexible, and/or bendable. In examples that include an integrated or peripheral computer, the computer may include at least one processor 18A and associated computer-memory 20A. The computer-memory may hold instructions that cause the processor to enact any of the processes disclosed herein. In some examples, the electronic display may be a liquid-crystal display (LCD). In some examples, the electronic display may be an active-matrix organic light-emitting diode (AMOLED) display, a passive-matrix organic light-emitting diode (PMOLED) display, or virtually any other kind of electronic display. Irrespective of the display technology, capacitive touch-screen componentry of touch-screen display device 10A may be configured to sense at least one touch point 22 effected by the user. An example touch point is the point of contact between the user's fingertip 24 and sensory surface 26 of the touch-screen display device.

Figure 2:
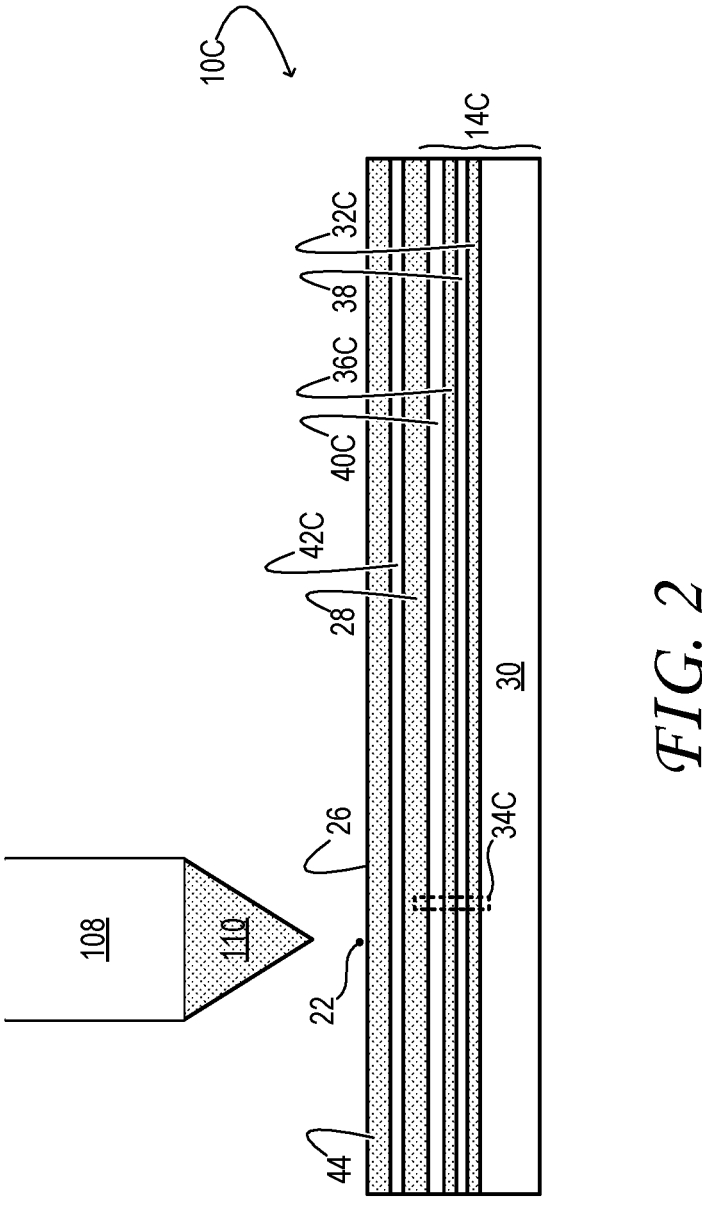
FIG. 2 shows aspects of an example touch-screen display device comprising an active-matrix OLED (AMOLED) display.
Figure 3:
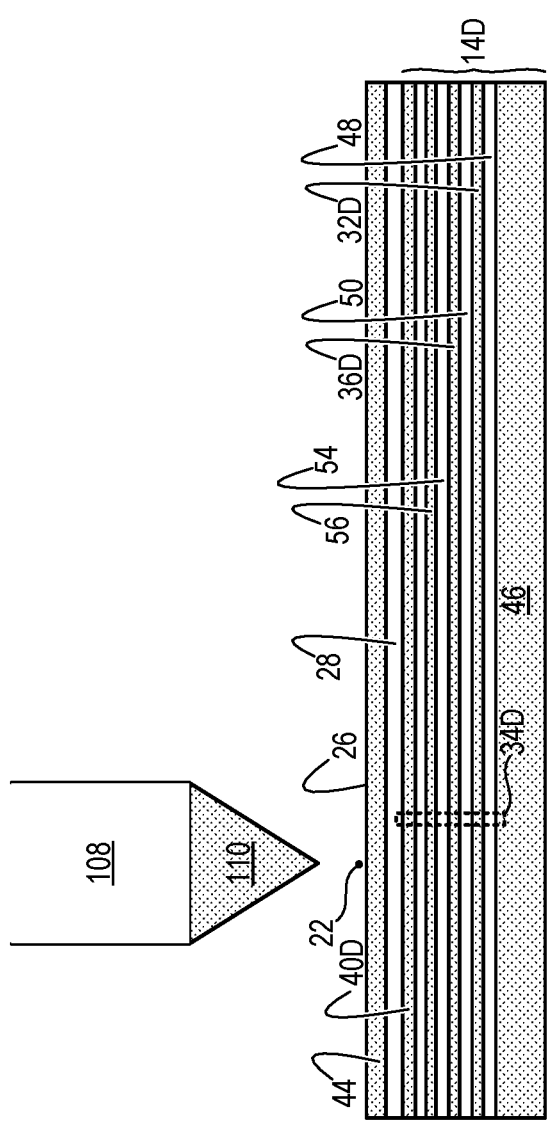
FIG. 3 shows aspects of an example touch-screen display device comprising an LCD.

FIGS. 2 and 3 show additional aspects of two different touch-screen display devices. Touch-screen display device 10C of FIG. 2 includes a capacitive touch sensor 28 arranged behind sensory surface 26, and AMOLED display 14C arranged behind the capacitive touch sensor. Capacitive touch sensor 28 is configured to sense the position of touch point 22 relative to the sensory surface. AMOLED display 14C includes a substrate 30 supporting a thin-film transistor (TFT) array 32C. The TFT array includes at least one TFT arranged at the crossing of each horizontal and vertical scan line of the display; this TFT addresses (charges and discharges) the pixel element 34C arranged at that crossing. In some examples, a second TFT may be associated with each pixel element and configured to maintain the current through that pixel element for the duration of the AMOLED refresh interval. AMOLED display 14C also includes an optically transparent common electrode (or cathode) 36C and an electroluminescent organic layer 38 arranged between the TFT array and the common electrode. In polychromatic AMOLED displays, the electroluminescent organic layer may include at least three different luminophores segregated into different pixel elements in a repeating, macropixel pattern. In FIG. 2, common electrode 36C is bonded to capacitive touch sensor 28 via a film 40C of optically clear adhesive (OCA). In some examples, the OCA film bonding the common electrode to the capacitive touch sensor may be 5 to 10 micrometers (μm) in thickness. A second film 42C of OCA may be used to bond capacitive touch sensor 28 to cover glass 44.

Touch-screen display device 10D of FIG. 3 includes a capacitive touch sensor 28 arranged behind sensory surface 26, with LCD 14D arranged behind the capacitive touch sensor. In the example shown in FIG. 3, backlighting for LCD 14D originates in light-guide plate (LGP) 46 and illuminates polarizer 48 via a series of reflectors, diffusers, and/or prismatic films. Polarizer 48 selects light of a desired polarization state for entry into TFT array 32D. TFT array 32D supports a nematic liquid-crystal film 50 capable of selectively rotating the plane of polarization of the backlighting in response to external bias applied to the individual light-releasing pixel elements 34D of the TFT array. The nematic liquid-crystal film is bounded on the opposite side by optically transparent common electrode 36D. Polarized light from each pixel element passes through the common electrode and through color-filter (CF) 54, which includes an array of CF elements positioned in registry with the pixel elements 34D, and then through second polarizer 56 where light of the undesired polarization state is blocked. The second polarizer is bonded to capacitive touch sensor 28 by via film 40D of optically clear adhesive (OCA). Continuing improvement in LCD manufacturing enables CF 54, second polarizer 56, and OCA film 40D to be made increasingly thin.

Figure 4:
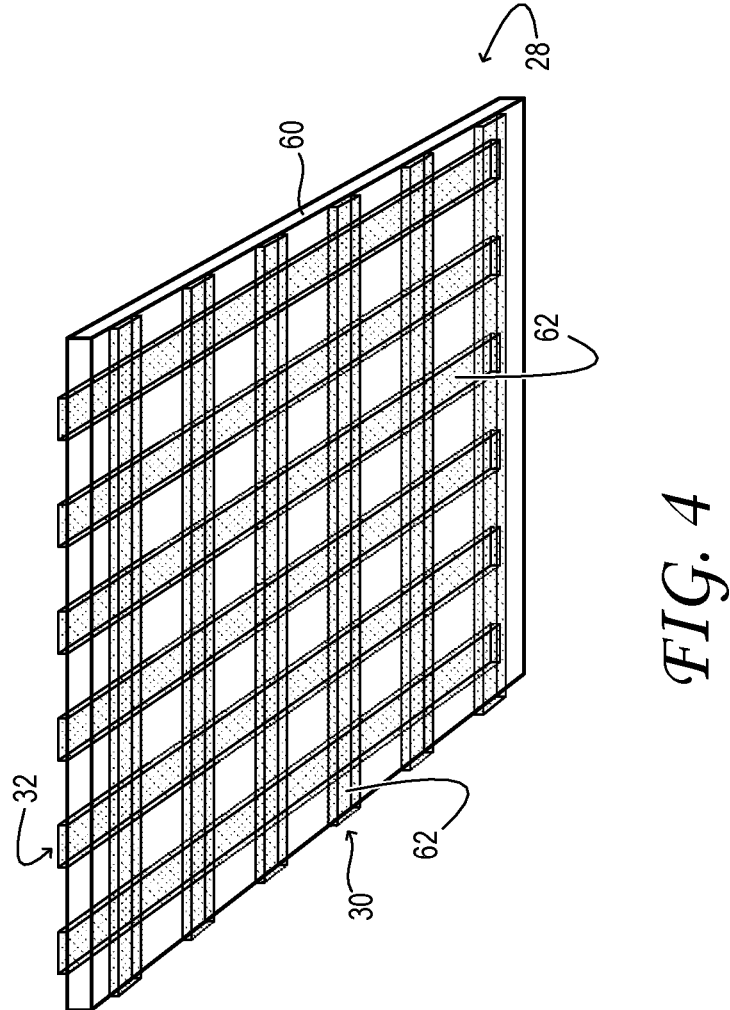
FIGS. 4 and 5 show aspects of an example capacitive touch sensor of a touch-screen display device.

FIG. 4 shows aspects of an example capacitive touch sensor 28 in expanded detail. The capacitive touch sensor comprises a series of row electrodes 30 that crosses a series of column electrodes 32. Touch screens here contemplated may include any number N of row electrodes and any number M of column electrodes. Although it is customary to have the row electrodes aligned horizontally and the column electrodes aligned vertically, that aspect is in no way necessary, as the terms 'row' and 'column' may be exchanged everywhere in this description. In the illustrated example, the series of row electrodes 30 is arranged on one face of a dielectric layer 60, and the series of column electrodes 32 is arranged on the opposite face of the dielectric layer. The dielectric layer may be 50 to 100 μm in some examples, although other thickness ranges are also envisaged. The dielectric layer may comprise a polymer film. In one non-limiting example, the dielectric layer comprises polyethylene terephthalate (PET). In curved, flexible and/or bendable touch-screen displays, the dielectric layer may be curved, flexible and/or bendable. Row electrodes 30 and column electrodes 32 each comprise electronically conductive material 62 distributed in the form of narrow (e.g., one mm-wide), elongate bands on the opposite faces of dielectric layer 60. Adjacent electrodes may be separated by one to five millimeters in some examples. The composition of electronically conductive material 62 is not particularly limited. The electronically conductive material may comprise a metallic microwire mesh, a metal-particle or metal-island film, or a film of a degenerately doped semiconductor, such as indium-tin oxide (ITO), for instance. Irrespective of the implementation, a capacitive touch sensor comprising row and column electrodes of relatively low resistance and high optical transmittance is desirable.

Figure 5:
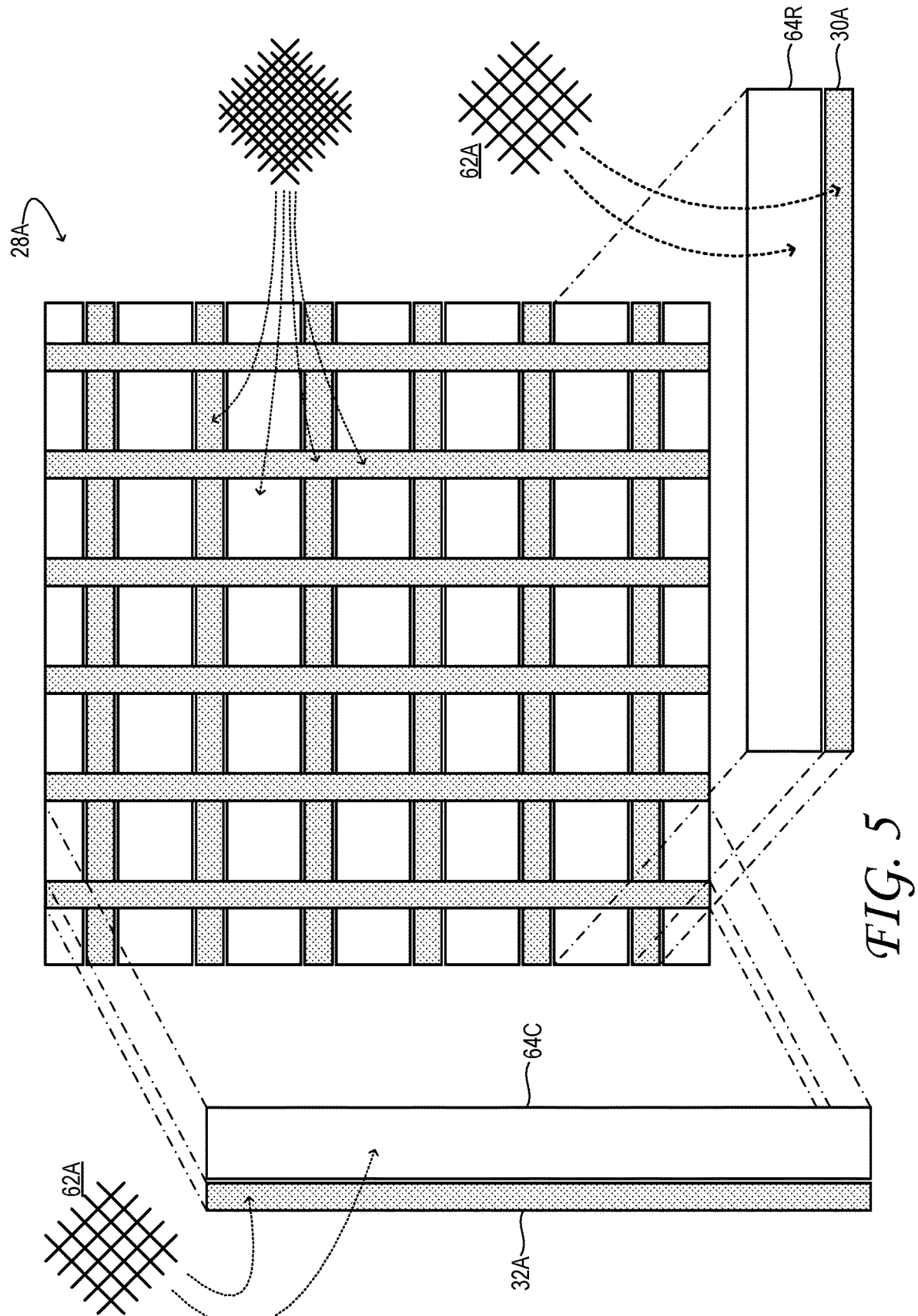

Turning now to FIG. 5, one example form of the electronically conductive material is a microwire mesh 62A, which embodies row electrodes 30A and column electrodes 32A of capacitive touch sensor 28A. Certain non-limiting examples of a microwire mesh comprise silver wires about 1.5 to 5 μm in diameter. In some examples, the cell pattern of the microwire mesh may be registered geometrically to the pixel pattern of the underlying display so as to avoid undesirable Moiré-type effects. To avoid the appearance of criss-crossed dark bands corresponding to row electrodes 30A and column electrodes 32A, an arrangement of electronically non-functional optical attenuators 64 may be used to improve display uniformity through the capacitive touch sensor. In the illustrated example, electronically non-functional optical attenuators 64R are positioned between adjacent row electrodes 30A, and electronically non-functional optical attenuators 64C are positioned between adjacent column electrodes 32A. In the illustrated example, the electronically non-functional optical attenuators comprise disconnected patches of microwire mesh 62A. When embodied as microwire mesh, the electronically non-functional optical attenuators may also be registered geometrically to the pixel pattern of the underlying display.

Figure 6:
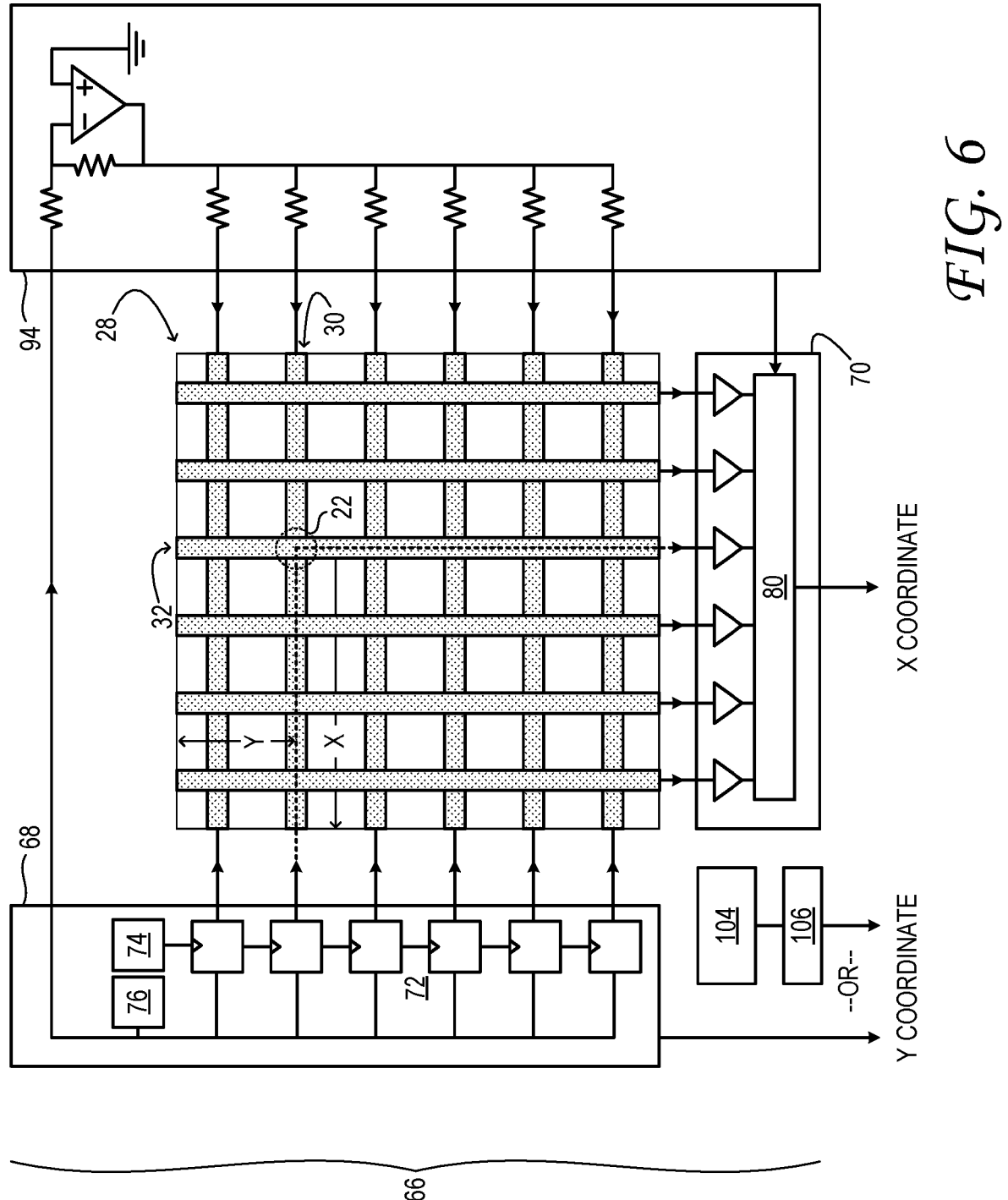
FIG. 6 shows aspects of example touch-screen logic of a touch-screen display device.

Turning now to FIG. 6, row electrodes 30 and column electrodes 32 of capacitive touch sensor 28 are addressed by touch-screen logic 66. The touch-screen logic is configured to sense user contact on or near the sensory surface of the touch-screen display device, including coordinates X, Y directly beneath a point of contact of a finger, touch-screen stylus, or other touch input on the sensory surface. To that end, the touch-screen logic includes row-drive circuit 68 and column-sense circuit 70. The terms 'row-drive' and 'column-sense' are appropriate for configurations in which signal is driven through the row electrodes and sensed via the column electrodes. Naturally, the opposite configuration is equally envisaged.

Column-sense circuit 70 is configured to sense a column signal from the series of column electrodes 32. In the illustrated example, the column-sense circuit includes M column amplifiers, each coupled to a corresponding column electrode. Row-drive circuit 68 includes a row counter 72 in the form of an N-bit shift register with outputs driving each of N row electrodes 30. The row counter is clocked by row-driver clock 74. The row counter includes a blanking input to temporarily force all output values to zero irrespective of the values stored within the shift-register. Excitation of one or more rows may be provided by filling the row counter with ones at every output to be excited, and zeroes elsewhere, and then toggling the blanking signal with the desired modulation from modulation clock 76. In the illustrated example, the output voltage may take on only two values, corresponding to the one or zero held in each bit of the row counter. In other examples, the output voltage may take on a greater range of values, to reduce the harmonic content of the output waveforms or decrease radiated emissions, for instance. In some examples, row-drive circuit 68 may include one or more additional registers offset with respect to row counter 72 and blanked by modulation clocks of different frequencies. Such variants enable concurrent excitation of two or more row electrodes (e.g., electrodes separated by a fixed number of intervening rows).

Row-drive circuit 68 of FIG. 6 applies an excitation pulse to each row electrode 30 in a predetermined sequence. In this manner, the row-drive circuit is configured to concurrently drive one or more row electrodes of the series of row electrodes. During a period in which the sensory surface is untouched, none of the column amplifiers registers an above-threshold output. However, the electrical impedance at each crossing of a row electrode 30 and a column electrode 32 is responsive to the proximity of a finger or stylus to that crossing: when the user places a fingertip on the sensory surface, the fingertip capacitively couples one or more row electrodes 30 proximate to (e.g., crossing) touch point 22 to one or more column electrodes 32 also proximate to the touch point. The capacitive coupling induces an above-threshold signal from the column amplifiers associated with the column electrodes behind the touch point. Column-sense circuit 70 returns, as the X coordinate of the touch point, the numeric value of the column providing the greatest signal received. Touch-screen logic 66 determines which row was being excited when the greatest signal was received and returns the numeric value of that row as the Y coordinate of the touch point.

Column-sense circuit 70 may also return a Z coordinate that varies in dependence on the strength of the signal received at coordinates X, Y. Accordingly, touch-screen logic 66 may distinguish firm touch, associated with strong signal, from light touch, associated with weaker signal, and from hover, associated with still weaker but detectable signal.

Returning briefly to FIGS. 2 and 3, an insulated conductor (or degenerately doped semiconductor) such as common electrodes 36C or 36D may capacitively couple the series of row electrodes 30 to the series of column electrodes 32 of capacitive touch sensor 28 absent touch of a finger or stylus. Such coupling adds an undesired, always-on component to the column signal from column electrodes 32. Operative at frequencies used to drive the touch-screen electrodes, the unwanted coupling increases with increasing thinness of the dielectric layer (or layers) that separate the touch-screen electrodes from the common electrode of the underlying electronic display. As noted above, the insulated conductor comprising common electrode 36C of AMOLED display 14C may reside just microns from the series of row electrodes 30 of capacitive touch sensor 28 (or of the series of column electrodes 32, whichever is nearer). In some examples, the effects of unwanted capacitive coupling are significant in touch-screen display devices where the common electrode of the display is less than 50 μm separated from the row or column electrodes. Such effects are even more pronounced when the common electrode resides still closer (e.g., within 20 μm) from the row or column electrodes. The unwanted coupling also increases with increasing modulation frequency of the excitation signal (due to the expected frequency dependence of the capacitive reactance).

Figure 7:
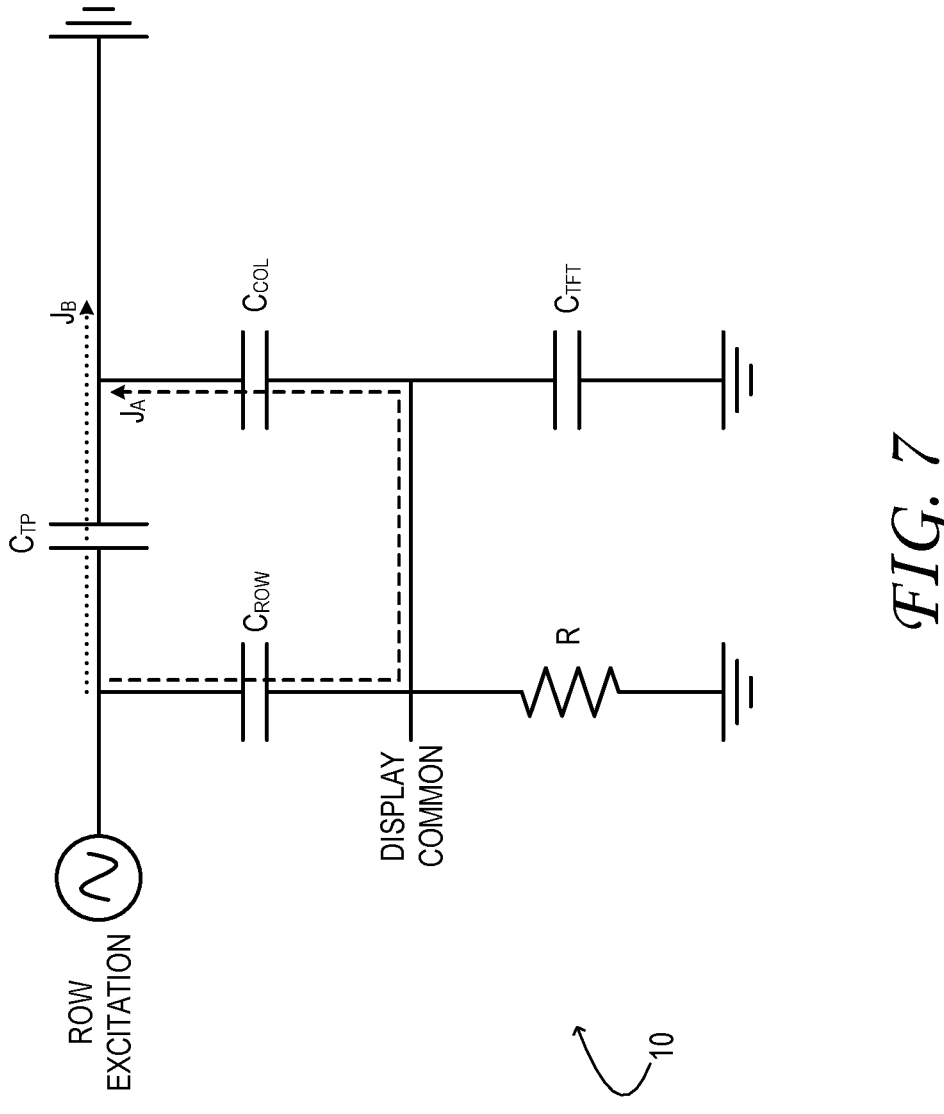
FIG. 7 provides a simplified, schematic equivalent-circuit diagram of a portion of a touch-screen display device.

Capacitive coupling via the common electrode of the electronic display is illustrated in FIG. 7, which provides a simplified, schematic equivalent-circuit diagram of a portion of a touch-screen display device 10. In particular, capacitive coupling via $C_{ROW}$ and $C_{COL}$ offers an undesirable low-impedance path (dashed line JA) between the one or more row electrodes excited by the row-drive circuit and one or more column electrodes through which the touch point is sensed. This low-impedance path adds an undesired component to the signal (dotted line $J_B$) resulting from capacitive coupling through CIP, the user's finger, stylus, or other input device, thereby decreasing the touch sensitivity. For instance, if expected touch effect is $\Delta C_j/C_j$, where $C_j$ is the capacitance between the excited row electrode and column electrode j, then addition of the undesired component reduces it to $\Delta C_j/(C_j+C_p)$, where $C_p$ is the capacitance between the excited row electrode and the common electrode of the display. The reduction in sensitivity becomes more significant at higher frequencies—e.g., the relative touch effect may be 20% at 50 kHz but only 8% at 300 kHz. In addition, reduction in the intrinsic touch sensitivity of the capacitive touch sensor may expose the system undesirably to the effects of operational variables, such as touch position across the panel as well as external (e.g., thermal) stresses.

Typically, the undesired component arising from capacitive coupling with the common electrode of the electronic display cannot be assumed to be invariant over time or across the range of expected use scenarios of touch-screen display device 10. Rather, the undesired component is a function of minute dimensional and impedance changes that occur over relatively long timescales during the service life of the touch-screen display device. Accordingly, the undesired component may vary in dependence on the lifetime usage of the touch-screen display device. Additional dimensional and impedance changes may occur over relatively short timescales, such as during device warm-up, and pursuant to use scenarios in which the device is subjected to mechanical stress (e.g. dropping, bending, compression, etc.). More generally, the undesired component may vary in dependence on any use condition of the touch-screen display device.

Figures 8A, 8B, 8C:
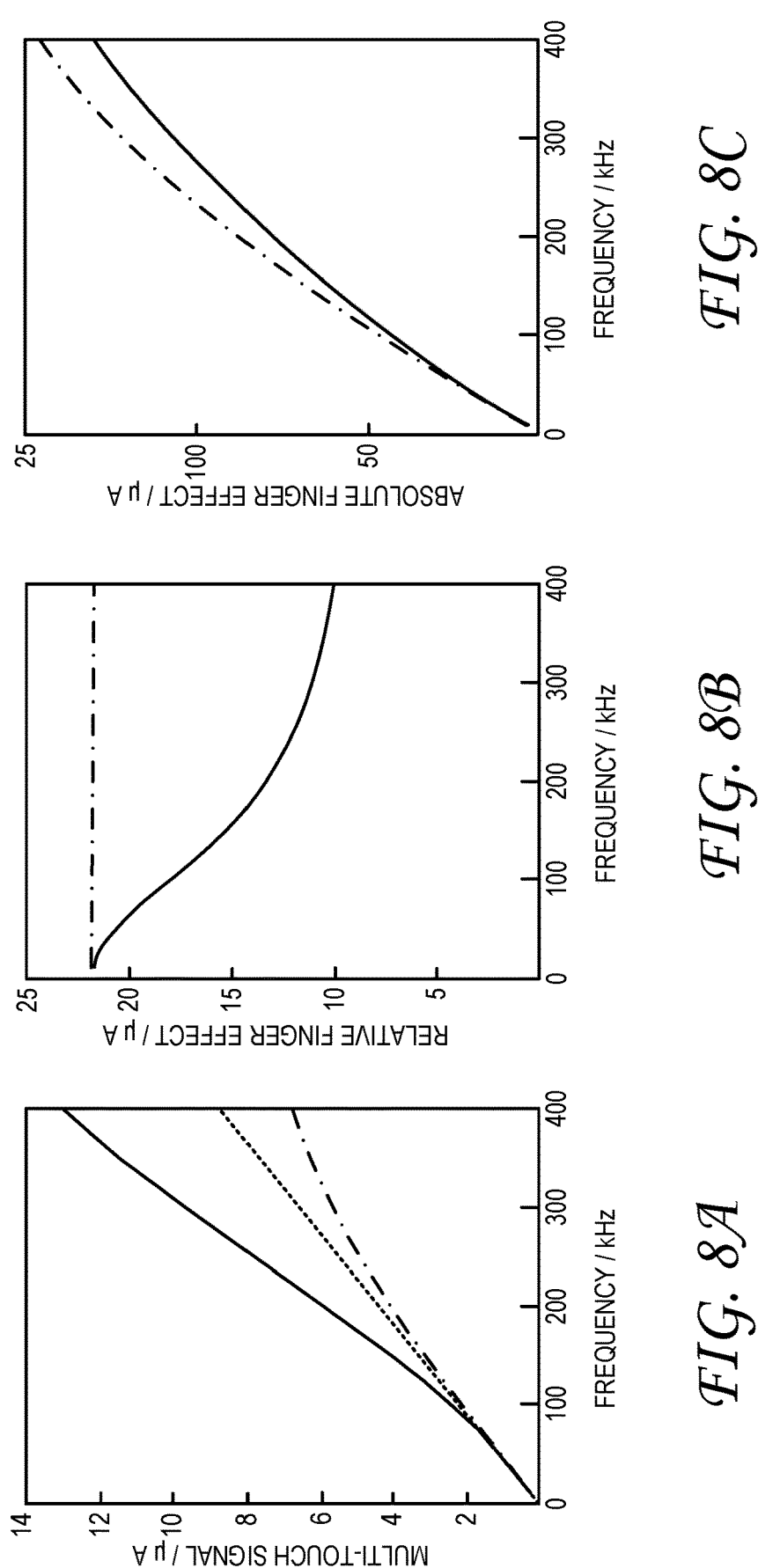
FIG. 8A is a graph of the amplitude of a multi-touch signal from an example capacitive touch sensor as a function of the modulation frequency used to excite the row electrodes of the capacitive touch sensor.
FIG. 8B is a graph of the relative touch effect on an example capacitive touch sensor as a function of the modulation frequency used to excite the row electrodes of the capacitive touch sensor.
FIG. 8C is a graph of the absolute touch effect on an example capacitive touch sensor as a function of the modulation frequency used to excite the row electrodes of the capacitive touch sensor.

As noted above, the level of the undesired component arising from capacitive coupling via the common electrode of the display also depends on the modulation frequency of the row excitation, because (looking again at FIG. 7) the reactances across capacitances $C_{ROW}$, $C_{COL}$, and $C_{TP}$ depend on the frequency. The graphs of FIGS. 8A through 8C illustrate the practical effect of the undesired component at different values of the excitation frequency. The current values represented in these graphs were computed based on an appropriate model of a closely spaced capacitive touch sensor and common display electrode. The solid lines show the signal values as corrupted by the undesired component, while the dot-dashed lines show the uncorrupted signal. Specifically, FIG. 8A shows the amplitude of a multi-touch signal due to a finger placed on the sensory surface of an example capacitive touch sensor as a function of the modulation frequency used to excite the row electrodes of the capacitive touch sensor. The dashed line in FIG. 8A represents the idealized linear characteristic. Accompanying FIG. 8B shows the relative touch effect due to the finger touch, and FIG. 8C shows the absolute touch effect. It is evident from comparison of FIGS. 8A through 8C that the undesired capacitive coupling path significantly increases the multi-touch signal with increasing frequency; however, the absolute touch signal does not increase by a commensurate amount. As a result, the relative touch effect in FIG. 8B decreases with frequency after removal of the undesired component. Based on the frequency dependence of the touch effect (or suitable surrogate), it is possible to estimate the level of the undesired component on the column signal— viz., by sensing the column signal pursuant to row excitation at two or more different modulation frequencies, under otherwise equivalent conditions.

To that end, and returning again to FIG. 6, modulation clock 76 may be operable at a normal, upper frequency. During a major portion of a duty cycle of capacitive touch sensor 28, touch-screen logic 66 may operate the modulation clock at the upper frequency and record a first column signal. During a minor portion of the duty cycle (i.e., intermittently), the touch-screen logic may operate the modulation clock at the lower frequency and record a second column signal. In these examples, correction circuit 80 may be configured to provide a corrected column output based at least partly on the first and second column signals. In sum, the appropriately scaled difference between the first and second column signals provides an estimate of the level of the undesired component, which is assumed to be invariant over a given duty cycle. The correction circuit then 'subtracts' the amplitude of the undesired component from the column signal sampled at the upper modulation frequency, even during portions of the duty cycle in which no second signal is available. This feature improves the touch sensitivity.

The 'upper' and 'lower' frequencies referenced above may be frequencies selected from within broad ranges of modulation frequencies. In some examples, each upper frequency may be a frequency in the range of 25 kilohertz (kHz) to 500 kHz, and each lower frequency may be lower than the selected upper frequency—e.g., by about one order of magnitude, or by more than one order of magnitude.

In some examples, the first and second column signals are parameters in a correction transform (e.g., a linear transform) that operates on the column signal sampled at the upper modulation frequency during the major portion of the duty cycle. A linear transform is reflective of the linear increase of multi-touch sensor signals, of the proportionality between impedance and frequency, and of the observation that non-linear effects are observed primarily at high frequencies due to undesired coupling via the common electrode of the display. Accordingly, as the expected signals can be well-estimated at each frequency, it is possible to subtract away the non-linear effect arising from the undesired coupling, or otherwise to estimate the relation between column signals with and without the undesired component, at each frequency. In some examples, that relation may be retrieved during runtime of the touch-screen display device from a stored, look-up table. Other, less transient, parameter values in the correction transform (e.g., coefficients that multiply or scale the first and second column signals) may be obtained during a calibration phase in the manufacture of a touch-screen display device. Such parameter values may be stored in firmware of the touch-screen display device and used by correction circuit 80 during runtime, to estimate the level of the undesired component and thereby correct the column signal. In some examples, the correction transform or parameters thereof may be a function of one or more operational parameters of the touch-screen display device, such as lifetime usage, the presence of a palm on the sensory surface, or the orientation in which the device is being held.

In some examples, correction circuit 80 may be implemented using analog processing, at least in part. The correction circuit may include operational amplifiers and/or analog arithmetic componentry, for instance. In some examples, the correction circuit may be implemented digitally, at least in part. Computer memory of a touch-screen display device may store a look-up table populated by an array of estimates of the undesired component or of corrected column-sense outputs, for instance. The look-up table may be indexed by bracketing values that correspond to the first and/or second column signal, for example. Thus the correction circuit may be configured to retrieve the corrected column output from an electronically stored look-up table.

FIG. 9 shows aspects of an example method 82 to process touch input on a touch-screen display device having an electronic display layer arranged behind a series of column electrodes and behind a series of row electrodes. As noted above, the electrical impedance at each crossing of a row and column electrode is responsive to proximity of a touch input (e.g., finger or stylus tip) to that crossing. The method may be supported by the touch-screen display-device configurations described herein, or by other configurations.

At 84 of method 82, an excitation signal of an upper modulation frequency is applied to a selected row electrode of a series of row electrodes. At 86 a first column signal from the series of column electrodes is sensed while the selected row electrode is excited at the upper modulation frequency. At 87 the excitation signal of the upper modulation frequency is suspended and an excitation frequency of a lower modulation frequency is applied, intermittently, to the selected row electrode. At 88 a second column signal from a series of column electrodes is sensed, intermittently, while the selected row electrode is excited at the lower modulation frequency. At 89 a correction transform is computed based partly on the first and second column signals. In some examples the correction transform comprises a linear transform. At 90 a corrected column output is provided. The corrected column output is based at least partly on the first column signal and on the correction transform. At 92 of method 82, the selected row electrode is iteratively updated (e.g., incremented) according to a pre-defined row-drive sequence.

In the examples above, capacitive coupling via the common electrode of the display imparts an undesired component on the column signal, which is subsequently sensed and corrected. In the examples below, the undesired component is pre-emptively suppressed or excluded from the column signal, thereby reducing or eliminating the need for subsequent correction. Returning now to FIG. 6, touch-screen logic 66 includes compensation circuit 94. As row counter 72 applies an excitation signal to the selected row electrode 30, compensation circuit 94 applies a compensation signal to one or more other row electrodes in the series of row electrodes. The compensation signal is a relatively low-amplitude signal, which is out-of-phase with respect to the excitation signal applied to the selected row electrode. In general, the amplitude and/or phase of the compensation signal may be determined such as to poise the common electrode of the display at the same ground potential recognized by column-sense circuit 70. If the ground potential for these components is the same then the column-sense circuit will sense no current JA (in FIG. 7). In some examples, all of the non-excited row electrodes in the series may receive the same compensation signal—viz., a lower-amplitude, anti-phase (or sign-inverted) version of the excitation signal. In some examples, accordingly, the compensation signal may lag the excitation signal by 180 degrees. In other examples, different non-excited row electrodes in the series may receive different compensation signals, which sum to a resultant anti-phase version of the excitation signal. Here the resultant may lag the excitation signal by 180 degrees.

The amplitude of the compensation signal may depend on the number of non-excited row electrodes to which a compensation signal is provided. In some examples, the amplitude of the compensation signal is A/P, where A is the amplitude of the excitation signal and P is the number of non-excited row electrodes in the series of row electrodes. According to an idealized model of the touch-screen display device, a compensation signal of magnitude A/P delivers the correct amount of charge to the common electrode to poise the common electrode at the AC ground potential of touch-screen logic 66.

FIG. 10 schematically illustrates an example series of row electrodes 30 concurrently receiving excitation and compensation signals. In the illustrated example, there are sixteen row electrodes in the series, and the fourth row is being excited at an amplitude of 6.0 VAC. Different excitation amplitudes and series with more or fewer row electrodes are equally envisaged. The fifteen other (non-excited) row electrodes in the series each receive a compensation signal which is 6/(16−1)=0.4 VAC in amplitude, of opposite phase. In other examples, as noted above, the non-excited row electrodes in a given series may instead be driven by compensation signal that differ in amplitude and/or phase. In still other examples (vide infra), the amplitude of the compensation signal may be determined dynamically (e.g., in a closed-loop manner) via the column-sense circuit—e.g., by sensing a response to the touch input on the column signal. Closed-loop control over the amplitude of the compensation signal may be useful for scenarios in which capacitive coupling within the touch-screen display device deviates from the expected, idealized behavior—e.g., due to unexpected usage or environmental factors.

In some examples, the compensation strategy herein may be applied to the entire series of row electrodes 30 of capacitive touch sensor 28, such that only one row electrode at a time is excited and the remaining, non-excited row electrodes each receive the compensation signal. In other examples, the series of row electrodes to which the compensation strategy is applied may be one of a plurality of subsets of row electrodes of the capacitive touch sensor. As noted above, a selected row electrode of a given subset may receive an excitation signal of a given modulation frequency, and the other electrodes of that subset may receive a compensation signal of the same modulation frequency. The compensation strategy herein may be applied to any, some, or all such subsets of row electrodes. In some variants, only those subsets receiving a relatively high-frequency excitation signal (e.g., >100 kHz) may be compensated in this manner.

Figure 11:
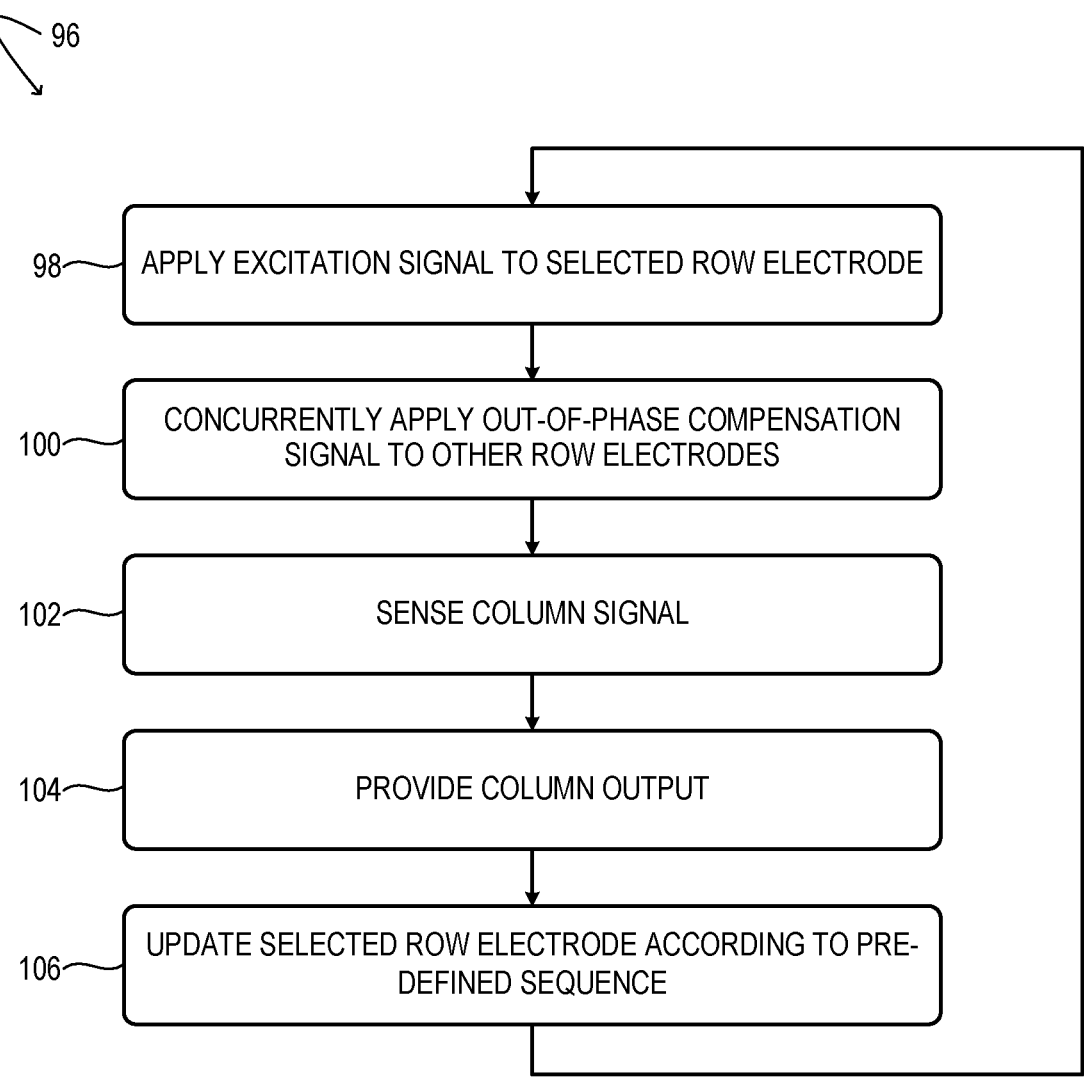
FIG. 11 shows aspects of another example method to process touch input on a touch-screen display device.

FIG. 11 shows aspects of an example method 96 to process touch input on a touch-screen display device having an electronic display layer arranged behind a series of column electrodes and behind a series of row electrodes. As noted above, the electrical impedance at each crossing of a row and column electrode is responsive to proximity of a touch input (e.g., finger or stylus tip) to that crossing. The method may be supported by the touch-screen display-device configurations described herein, or by other configurations.

At 98 of method 96, an excitation signal is applied to a selected row electrode of the series of row electrodes. Concurrently, at 100, a compensation signal is applied to one or more non-excited row electrodes of the series of row electrodes, the compensation signal being out-of-phase with respect to the excitation signal. At 102 a column signal from the series of column electrodes is sensed. At 104 a column output corresponding to the sensed column signal is provided. At 106 of method 96, the selected row electrode is iteratively updated (e.g., incremented) according to the pre-defined row-drive sequence.

No aspect of the foregoing drawings or description is intended to be limiting in any sense, as numerous variations, combinations, and subcombinations are also envisaged. For instance, steps 87 and 88 of method 82 may be incorporated into method 96. Here, the amplitude of the compensation signal provided at 100 of method 96 may be varied based on the sensed second column signal from method 82.

Returning briefly to FIG. 1, touch-screen stylus 108A may be used in lieu of the user's fingertip to execute touch input on touch-screen display device 10A. Accordingly, capacitive touch sensor 28 of the touch-screen display device may be configured to sense a relative position of the tip 110 of the touch-screen stylus relative to sensory surface 26 of the touch-screen display device. Like the user's fingertip, the tip of a passive touch-screen stylus comprises a high dielectric-constant material that capacitively couples the row and column electrodes under the touch point. A passive touch-screen stylus offers better touch accuracy than the fingertip, and may reduce smudging of the sensory surface. Although it is typical for a touch-screen stylus to take the form of an elongate cylinder or pen, that aspect is not strictly necessary. FIG. 1 shows an alternatively shaped touch-screen input device 108B usable on a large-format touch-screen display device 10B. It will be noted that touch-screen input devices of various shapes and sizes are envisaged herein and all references to a stylus equally apply to other touch-screen input devices.

Figure 12:
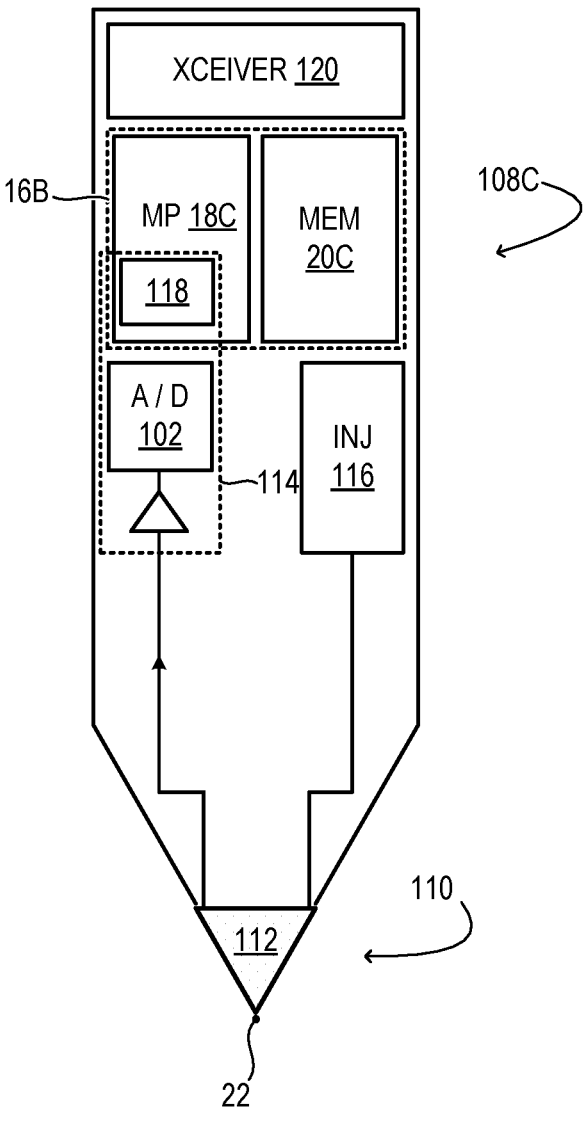
FIG. 12 shows aspects of an example active touch-screen stylus.

Relative to a passive stylus, an active touch-screen stylus offers even greater touch accuracy, in addition to faster and more accurate tracking of the touch point. In FIG. 12, probe electrode 112 is arranged at tip 110 of active touch-screen stylus 108C. The probe electrode is coupled operatively to associated sensory logic 114 and injection logic 116. The sensory and injection logic are coupled operatively to, and may be embodied partially within, microprocessor 18C. The microprocessor may be configured for digital signal processing (DSP) and associated with computer memory 20C. Sensory logic 114 includes linear analog componentry configured to maintain the probe electrode 112 at a constant voltage and to convert any current into or out of the probe electrode into a proportional current-sense voltage. The sensory logic may include an analog-to-digital (A/D) converter 118 that converts the current-sense voltage into digital data to facilitate subsequent processing.

Instead of capacitively coupling row and column electrodes of the capacitive touch sensor via a dielectric, sensory logic 114 of touch-screen stylus 108C senses the arrival of an excitation pulse from row electrode 30, behind touch point 22, and in response, injects charge into column electrode 32, also behind the touch point. To this end, injection logic 116 is associated with the probe electrode 112 and configured to control charge injection from the probe electrode 112 to the column electrode directly beneath the probe electrode. The injected charge appears, to column-sense circuit 70 of the capacitive touch sensor 28, similar to an electrostatic pulse delivered via capacitive coupling of the column electrode 32 to an energized row electrode 30 intersecting at touch point 22.

In some examples, sensory logic 114 and injection logic 116 are active during non-overlapping time windows of each touch-sensing frame, so that charge injection and charge sensing may be enacted at the same probe electrode 112. In this implementation, touch-screen logic 66 excites the series of row electrodes 30 during the time window in which the sensory logic is active, but suspends row excitation during the time window in which the touch-screen stylus 108C may inject charge. This strategy provides an additional advantage, in that it enables touch-screen logic 66 to distinguish touch points effected by touch-screen stylus 108C from touch points effected by a fingertip or palm. If column-sense circuit 70 detects charge from a column electrode 32 during the charge-injection time window of the touch-screen stylus 108C (when none of the row electrodes 30 are excited), then touch point 22 detected must be a touch point of the touch-screen stylus. However, if the column-sense logic detects charge during the charge-sensing window of the touch-screen stylus (when row electrodes 30 are being excited), then the touch point detected may be a touch point of a fingertip, hand, or passive touch-screen stylus, for example.

Active sensing followed by charge injection enables a touch point 22 of a very small area to be located precisely, and without requiring long integration times that would increase the latency of touch sensing. For example, when receiving the signal from row electrode 30, the touch-screen stylus 108C may inject a charge pulse with amplitude proportional to the received signal strength. Thus, capacitive touch sensor 28 may receive the electrostatic signal from touch-screen stylus 108C and calculate the Y coordinate, which may be the row providing the greatest signal from the touch-screen stylus, or a function of the signals received at that row and adjacent rows. Nevertheless, this approach introduces various challenges. The major challenge is that the sensory logic 114 and injection logic 116 must operate simultaneously—i.e., in full-duplex mode. Various methods—for example, code division or frequency division multiple access—may be applied to cancel the strong interference at the receiving direction from the transmitting direction. The capacitive touch sensor may be required to receive two signals simultaneously (one from the row electrode 30, and the other from the touch-screen stylus probe electrode 112). The system may also work by time-division, but at a cost in available integration time.

Another solution is to require touch-screen stylus 108C to assume a more active role in determining the touch point coordinates. In the illustrated example, sensory logic 114 of the touch-screen stylus 108C includes a local row counter 118, which is maintained in synchronization with row counter 72 (hereinafter, the remote row counter) of touch-screen logic 66. This feature gives the touch-screen stylus and the touch screen a shared sense of time, but without being wired together.

When probe electrode 112 touches the sensory surface, sensory logic 114 receives a waveform that lasts as long as the touch is maintained. The waveform acquires maximum amplitude at the moment in time when row electrode 30, directly beneath (i.e., adjacent) the probe electrode 112, has been energized. Sensory logic 114 is configured to sample the waveform at each increment of the local row counter 118 and determine when the maximum amplitude was sensed. This determination can be made once per frame, for example.

Because touch-screen stylus 108C and touch screen logic 66 have shared timing due to synchronized row counters, the state of local row-counter 118 at maximum sensed amplitude reports directly on the row coordinate—i.e., the Y coordinate—of touch point 22. In order to make use of this information, the Y coordinate must be communicated back to touch-screen logic 66. To this end, the touch-screen stylus includes transceiver 120 configured to wirelessly communicate the computed row coordinate to row-sense logic of the touch screen. This disclosure embraces various modes of communicating data, including the Y coordinate, from the touch-screen stylus to the touch screen.

As noted above, the control methods herein may be tied to a computer system of one or more computing devices. Such methods and processes may be implemented as an application program or service, an application programming interface (API), a library, and/or other computer-program product.

Figure 13:
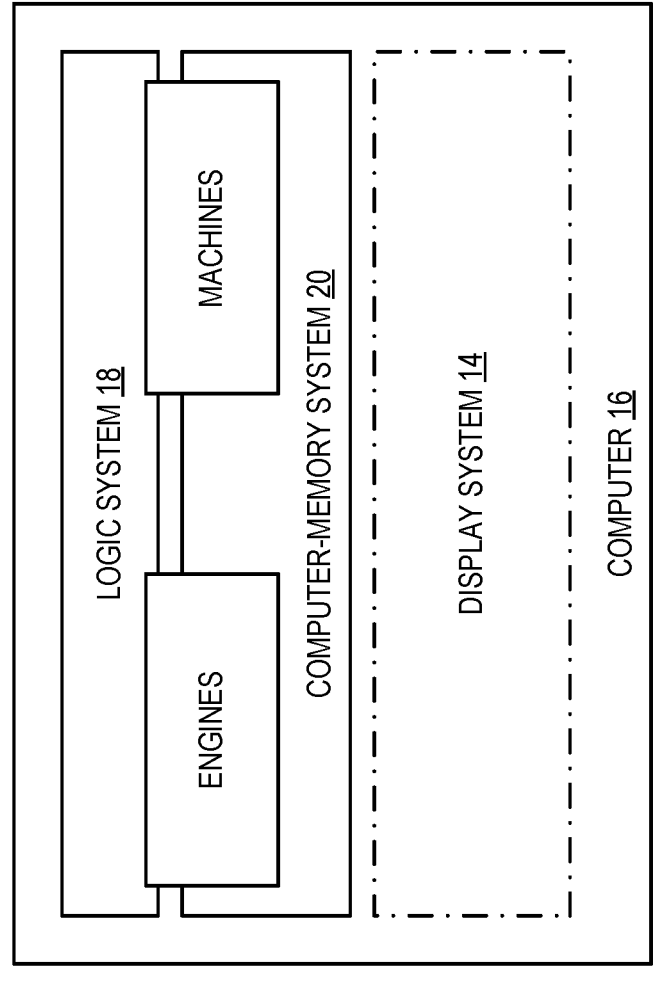
FIG. 13 shows aspects of an example computer configured to process touch input on a touch-screen display device.

FIG. 13 provides a schematic representation of an example computer 16 configured to provide some or all of the computer system functionality disclosed herein. In the description above, computer 16 may be embodied as computer 16A of touch-screen display device 10A and/or computer 16B of touch-screen stylus 108C. Computer 16 of FIG. 13 includes a logic system 18 and a computer-memory system 20. Computer 16 may also include a display system 14 and other systems not shown in the drawings.

Logic system 18 includes one or more physical devices configured to execute instructions. For example, the logic system may be configured to execute instructions that are part of at least one operating system (OS), application, service, and/or other program construct. The logic system may include at least one hardware processor (e.g., microprocessor, central processor, central processing unit (CPU) and/or graphics processing unit (GPU)) configured to execute software instructions. Additionally or alternatively, the logic system may include at least one hardware or firmware device configured to execute hardware or firmware instructions. A processor of the logic system may be single-core or multi-core, and the instructions executed thereon may be configured for sequential, parallel, and/or distributed processing. Individual components of the logic system optionally may be distributed among two or more separate devices, which may be remotely located and/or configured for coordinated processing. Aspects of the logic system may be virtualized and executed by remotely-accessible, networked computing devices configured in a cloud-computing configuration.

Computer-memory system 20 includes at least one physical device configured to temporarily and/or permanently hold computer system information, such as data and instructions executable by logic system 18. When the computer-memory system includes two or more devices, the devices may be collocated or remotely located. Computer-memory system 20 may include at least one volatile, nonvolatile, dynamic, static, read/write, read-only, random-access, sequential-access, location-addressable, file-addressable, and/or content-addressable computer-memory device. Computer-memory system 20 may include at least one removable and/or built-in computer-memory device. When the logic system executes instructions, the state of computer-memory system 20 may be transformed—e.g., to hold different data.

Aspects of logic system 18 and computer-memory system 20 may be integrated together into one or more hardware-logic components. Any such hardware-logic component may include at least one program- or application-specific integrated circuit (PASIC/ASIC), program- or application-specific standard product (PSSP/ASSP), system-on-a-chip (SOC), or complex programmable logic device (CPLD), for example.

Logic system 18 and computer-memory system 20 may cooperate to instantiate one or more logic machines or engines. As used herein, the terms 'machine' and 'engine' each refer collectively to a combination of cooperating hardware, firmware, software, instructions, and/or any other components that provide computer system functionality. In other words, machines and engines are never abstract ideas and always have a tangible form. A machine or engine may be instantiated by a single computing device, or a machine or engine may include two or more subcomponents instantiated by two or more different computing devices. In some implementations, a machine or engine includes a local component (e.g., a software application executed by a computer system processor) cooperating with a remote component (e.g., a cloud computing service provided by a network of one or more server computer systems). The software and/or other instructions that give a particular machine or engine its functionality may optionally be saved as one or more unexecuted modules on one or more computer-memory devices.

Machines and engines may be implemented using any suitable combination of machine learning (ML) and artificial intelligence (AI) techniques. Non-limiting examples of techniques that may be incorporated in an implementation of one or more machines include support vector machines, multilayer neural networks, convolutional neural networks (e.g., spatial convolutional networks for processing images and/or video, and/or any other suitable convolutional neural network configured to convolve and pool features across one or more temporal and/or spatial dimensions), recurrent neural networks (e.g., long short-term memory networks), associative memories (e.g., lookup tables, hash tables, bloom filters, neural Turing machines and/or neural random-access memory) unsupervised spatial and/or clustering methods (e.g., nearest neighbor algorithms, topological data analysis, and/or k-means clustering), and/or graphical models (e.g., (hidden) Markov models, Markov random fields, (hidden) conditional random fields, and/or AI knowledge bases)).

When included, display system 14 may be used to present a visual representation of data held by computer-memory system 20. The visual representation may take the form of a graphical user interface (GUI) in some examples. The display system may include one or more display devices utilizing virtually any type of technology. In some examples, display system may include one or more virtual-, augmented-, or mixed reality displays.

To summarize, one aspect of this disclosure is directed to a touch-screen display device comprising a series of column electrodes, a series of row electrodes, an electronic display layer arranged behind the series of column electrodes and behind the series of row electrodes, a row-drive circuit, and a column-sense circuit. The series of row electrodes crosses the series of column electrodes such that an electrical impedance at each crossing of a row and column electrode is responsive to proximity of a touch input to that crossing. Thea row-drive circuit is configured to apply an excitation signal to a selected row electrode of the series of row electrodes and to concurrently apply a compensation signal to one or more other row electrodes of the series of row electrodes, the compensation signal being out-of-phase with respect to the excitation signal. The column-sense circuit is configured to sense a column signal from the series of column electrodes and to provide a corresponding column output.

In some implementations, the row-drive circuit is further configured to iteratively update the selected row electrode according to a predetermined sequence. In some implementations, the compensation signal is 180 degrees out-of-phase with respect to the excitation signal. In some implementations, the touch-screen display device includes a capacitive touch sensor, and the series of row electrodes comprises each row electrode of the capacitive touch sensor. In some implementations, the touch-screen display device includes a capacitive touch sensor, the series of row electrodes is one of a plurality of subsets of row electrodes of the capacitive touch sensor, the excitation signal is a signal of an upper modulation frequency, and the row-drive circuit is further configured to apply an excitation signal of a lower modulation frequency to a selected row electrode of at least one other subset of the row electrodes of the touch-screen display device. In some implementations, the electronic display layer includes an insulated conductor, and the insulated conductor capacitively couples the series of row electrodes to the series of column electrodes absent the touch input, thereby adding an undesired component to the column signal. In some implementations, an amplitude of the compensation signal is determined such as to poise the insulated conductor at a ground potential recognized by the column-sense circuit. In some implementations, an amplitude of the compensation signal is A/P, where A is the amplitude of the excitation signal and P is the number of the other row electrodes in the series of row electrodes. In some implementations, an amplitude of the compensation signal is determined dynamically via the column-sense circuit, by sensing a response to the touch input on the column signal. In some implementations, the insulated conductor is within 50 microns of the nearer of the series of row electrodes and the series of column electrodes. In some implementations, the undesired component varies in dependence on lifetime usage of the touch-screen display device. In some implementations, the undesired component varies in dependence on a use condition of the touch-screen display device. In some implementations, the electronic display layer includes an active-matrix organic light-emitting diode layer.

Another aspect of this disclosure is directed to a method to process touch input on a touch-screen display device having an electronic display layer arranged behind a series of column electrodes and behind a series of row electrodes. The method comprises: applying an excitation signal of an upper modulation frequency to a selected row electrode of the series of row electrodes; sensing a first column signal from the series of column electrodes, wherein an electrical impedance at each crossing of a row and column electrode is responsive to proximity of the touch input to that crossing; intermittently applying an excitation signal of a lower modulation frequency to the selected row electrode, the lower modulation frequency being lower than the upper modulation frequency; intermittently sensing a second column signal from the series of column electrodes; computing a correction transform based partly on the first and second column signals; and providing a corrected column output based at least partly on the first column signal and on the correction transform.

In some implementations, the correction transform comprises a linear transform. In some implementations, the electronic display layer includes an insulated conductor or degenerately doped semiconductor, which capacitively couples the series of row electrodes to the series of column electrodes absent the touch input, thereby adding an undesired component to the column signal. In some implementations, the insulated conductor or degenerately doped semiconductor is within 50 microns of the nearer of the series of row electrodes and the series of column electrodes. In some implementations, the undesired component varies in dependence on lifetime usage and/or a use condition of the touch-screen display device.

Another aspect of this disclosure is directed to a method to process touch input on a touch-screen display device having an electronic display layer arranged behind a series of column electrodes and behind a series of row electrodes. The method comprises: applying an excitation signal to a selected row electrode of the series of row electrodes; concurrently applying a compensation signal to one or more other row electrodes of the series of row electrodes, the compensation signal being out-of-phase with respect to the excitation signal; sensing a column signal from the series of column electrodes, wherein an electrical impedance at each crossing of a row and column electrode is responsive to proximity of the touch input to that crossing; and providing a column output corresponding to the sensed column signal, wherein the electronic display layer includes an insulated conductor or degenerately doped semiconductor that capacitively couples the series of row electrodes to the series of column electrodes absent the touch input, thereby adding an undesired component to the column signal.

In some implementations, the excitation signal is a first excitation signal and the column signal is a first column signal. Here the method further comprises: intermittently applying a second excitation signal to the selected row electrode, where a modulation frequency of the second excitation signal is lower than a modulation frequency of the first excitation signal; and intermittently sensing a second column signal from the series of column electrodes, wherein an amplitude of the compensation signal is varied based at least partly on the second column signal.

This disclosure is presented by way of example and with reference to the attached drawing figures. Components, process steps, and other elements that may be substantially the same in one or more of the figures are identified coordinately and are described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A touch-screen display device comprising:
a series of column electrodes;
a series of row electrodes crossing the series of column electrodes such that an electrical impedance at each crossing of a row and column electrode is responsive to proximity of a touch input to that crossing;
an electronic display layer having an insulated common electrode arranged behind the series of column electrodes and behind the series of row electrodes;
a row-drive circuit configured to apply an excitation signal to a selected row electrode of the series of row electrodes and to concurrently apply a non-zero compensation signal to one or more other row electrodes of the series of row electrodes, the compensation signal being out-of-phase with respect to the excitation signal; and
a column-sense circuit configured to sense a column signal from the series of column electrodes and to provide a corresponding column output,
wherein the row-drive circuit is further configured to iteratively update the selected row electrode, and wherein the compensation signal applied to the one or more other row electrodes, in combination with the excitation signal applied to the selected row electrode, brings the insulated common electrode to a ground potential recognized by the column-sense circuit.
2. The touch-screen display device of claim 1 wherein the compensation signal is 180 degrees out-of-phase with respect to the excitation signal.
3. The touch-screen display device of claim 1 wherein the touch-screen display device includes a capacitive touch sensor, and wherein the series of row electrodes comprises each row electrode of the capacitive touch sensor.

4. The touch-screen display device of claim 1 wherein the touch-screen display device includes a capacitive touch sensor, wherein the series of row electrodes is one of a plurality of subsets of row electrodes of the capacitive touch sensor, wherein the excitation signal is a signal of an upper modulation frequency, and wherein the row-drive circuit is further configured to apply an excitation signal of a lower modulation frequency to a selected row electrode of at least one other subset of the row electrodes of the touch-screen display device.

5. The touch-screen display device of claim 1 wherein the electronic display layer includes an insulated conductor, and wherein the insulated conductor capacitively couples the series of row electrodes to the series of column electrodes absent the touch input, thereby adding an undesired component to the column signal.

6. The touch-screen display device of claim 5 wherein an amplitude of the compensation signal is A/P, where A is the amplitude of the excitation signal and P is the number of the other row electrodes in the series of row electrodes.

7. The touch-screen display device of claim 5 wherein an amplitude of the compensation signal is determined dynamically via the column-sense circuit, by sensing a response to the touch input on the column signal.

8. The touch-screen display device of claim 5 wherein the insulated conductor is within 50 microns of the nearer of the series of row electrodes and the series of column electrodes.

9. The touch-screen display device of claim 5 wherein the undesired component varies in dependence on lifetime usage of the touch-screen display device.

10. The touch-screen display device of claim 5 wherein the undesired component varies in dependence on a use condition of the touch-screen display device.

11. The touch-screen display device of claim 1 wherein the electronic display layer includes an active-matrix organic light-emitting diode layer.

12. A method to process touch input on a touch-screen display device having an insulated common electrode of an electronic display layer arranged behind a series of column electrodes and behind a series of row electrodes, the method comprising:

applying an excitation signal to a selected row electrode of the series of row electrodes;

concurrently applying a non-zero compensation signal to one or more other row electrodes of the series of row electrodes, wherein the compensation signal is out-of-phase with respect to the excitation signal, and wherein the compensation signal applied to the one or more other row electrodes, in combination with the excitation signal applied to the selected row electrode, brings the insulated common electrode to a ground potential recognized by a column-sense circuit;

sensing a column signal from the series of column electrodes via the column-sense circuit, wherein an electrical impedance at each crossing of a row and column electrode is responsive to proximity of the touch input to that crossing; and providing a column output corresponding to the sensed column signal.

13. The method of claim 12 wherein the excitation signal is a first excitation signal and the column signal is a first column signal, the method further comprising:

intermittently applying a second excitation signal to the selected row electrode, where a modulation frequency of the second excitation signal is lower than a modulation frequency of the first excitation signal; and intermittently sensing a second column signal from the series of column electrodes, wherein an amplitude of the compensation signal is varied based at least partly on the second column signal.

14. The touch-screen display device of claim 1 wherein the row-drive circuit is configured to iteratively update the selected row electrode according to a predetermined sequence.

* * * * *